March 7, 1933. F. BAYMAN ET AL 1,900,325
AUTOMOBILE TABLE
Filed July 25, 1931 2 Sheets-Sheet 1
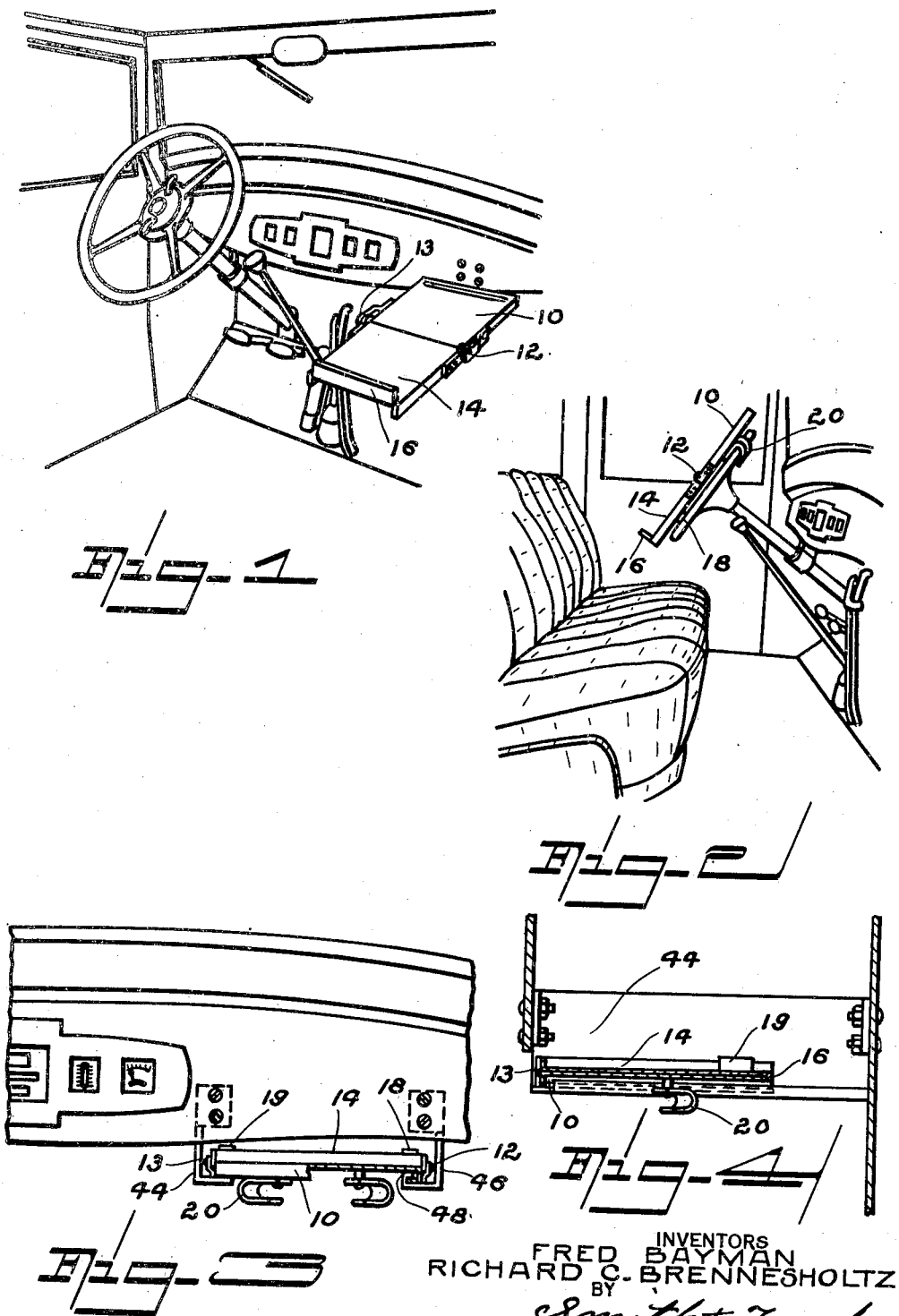
INVENTORS
FRED BAYMAN
RICHARD C. BRENNESHOLTZ
BY
Smith & Tuck
ATTORNEYS

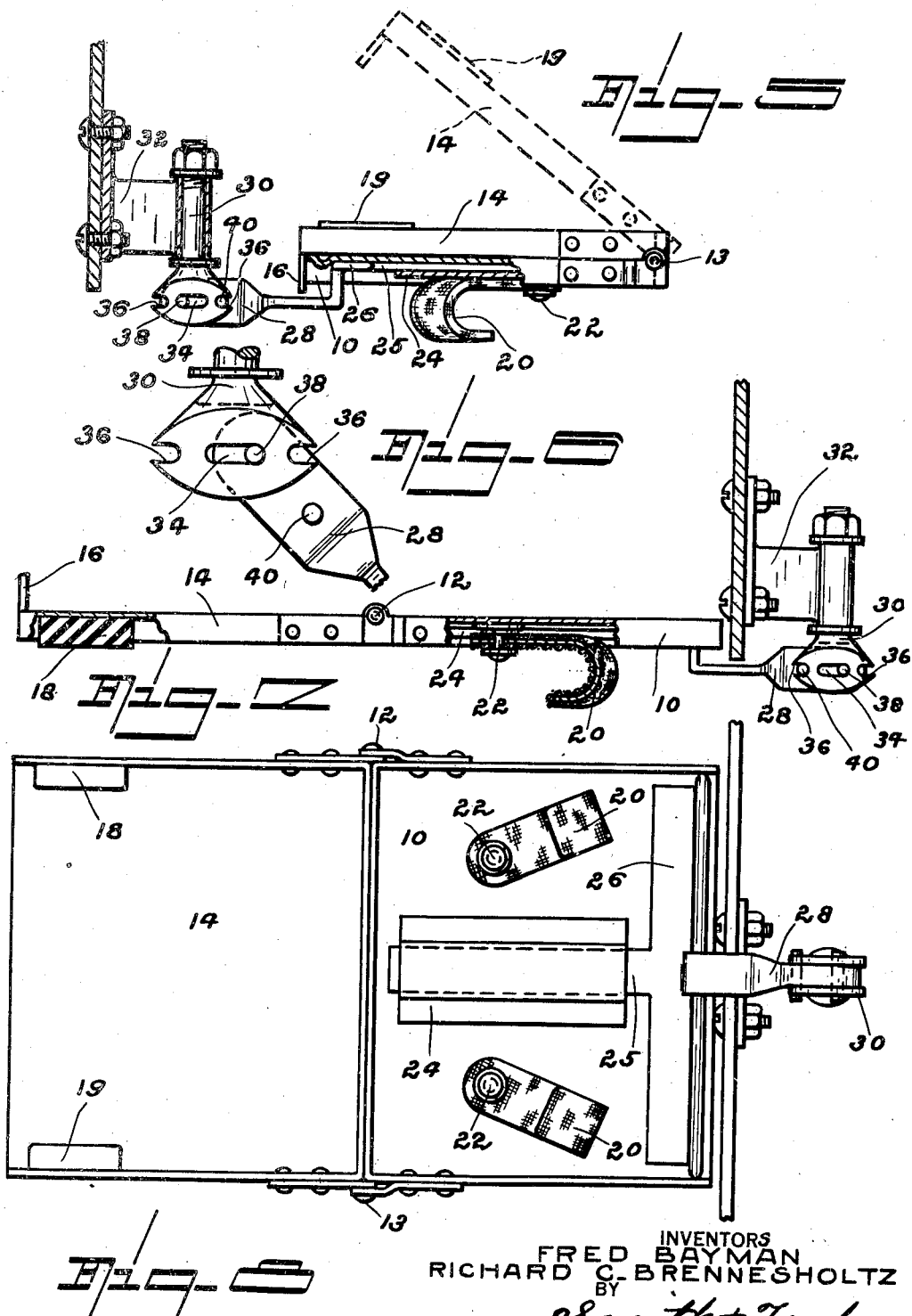

Patented Mar. 7, 1933

1,900,325

UNITED STATES PATENT OFFICE

FRED BAYMAN AND RICHARD C. BRENNESHOLTZ, OF SEATTLE, WASHINGTON

AUTOMOBILE TABLE

Application filed July 25, 1931. Serial No. 553,104.

Our present invention relates to the art of tables, and more particularly to a table which is intended for convenient storing and easy manipulation, and which might be termed an automobile table.

In describing our invention as applied to an automobile, we believe it will still be understood that such a table might be used in any place where space is at a premium, for instance in aeroplanes, staterooms of various kinds, control cabs of industrial equipment, and the like.

More and more people are using individual transportation; in fact, some salesmen and business people spend most of their time traveling about. As they are compelled to attend to correspondence, prepare various reports and the like, it is very desirable that they be provided with a convenient means upon which to write. It is to fill this want that that we have provided our table.

The principal object of our invention is to provide a table which will be convenient to use and when not in use, may be stored out of the way.

A further object is to provide a table so arranged that it may be used on the steering wheel of an automobile or aeroplane and without additional equipment and can be easily and conveniently stored and locked in the stored position.

A further object is to provide a table which will fold and thus reduce the space required for storing the same.

Other and more specific objects will be apparent from the following description taken in connection with the accompanying drawings, wherein Figure 1 is a perspective view showing our table as aranged for use on the seat adjacent to the driver's position in an automobile.

Figure 2 is a perspective view showing our table as secured to the steering wheel of an automobile.

Figures 3 and 4 show a convenient means for storing our table.

Figure 5 is an elevation showing our table in the folded position with certain parts being shown in section to better illustrate the construction.

Figure 6 is an enlarged fragmentary detail view showing the joint which supports our table.

Figure 7 shows our table in its extended position, certain parts being shown in section.

Figure 8 is a bottom plan view of our table showing the method of attaching the table to the support member and also illustrating the hinged construction more clearly.

Referring to the drawings throughout which like reference characters indicate like parts, numeral 10 designates the fixed portion of our table. This may be formed of any suitable material such as light metal or veneering which is metal bound, or in fact, most any form which has proven satisfactory in general use.

Hingedly supported to portion 10 as at 12 and 13 respectively is a second table member 14. This is preferably of similar construction to member 10, the joint being formed with sufficient rigidity so that when the table is opened a continuous plane will be formed. At the extreme outer end of member 14 we have found it desirable to provide a retaining ledge as 16. This is particularly desirable when the table is so mounted as to slope downwardly, as is indicated, for instance, in Figure 1. Secured to the lower side of member 14 are two spaced resilient blocks 18 and 19. These may be in the form of padding, felting, or most preferably, rubber, and are intended to provide a spacing means so that when these members rest upon the steering wheel of a car such as is shown in Figure 2 the metal trim of the table itself cannot injure or scratch, in any way, the steering wheel.

Secured to the under side of member 10 is a plurality of hook members 20. These are preferably slightly adjustable, angularly, upon their securing bolt or rivet 22, so that they may be made to fit more accurately the varying sizes of steering wheels found in different conveyances. It is further necessary to provide hooks 20 with suitable covering so that they will not mar the steering wheel. This may take the form, preferably, of a fabric, although rubberized materials can be used very satisfactorily.

Secured to the under side of member 10 is a guideway 24 which is adapted to receive the standard 25 of a T-shaped support member 26. The cross bar of the T should extend out quite close to either edge of the table so as to properly support the same against twisting. Secured to, or formed as part of T 26 is a supporting arm 28. This is adapted to engage a bifurcated pivot member 30. The pivot member in turn may be revolvably supported about a vertical axis in any convenient manner, as illustrated in Figures 5 and 7, by a bracket 32, which is preferably secured to the inner side of a dash so that when the table is in its folded position it may be swung entirely out of view.

An inspection of Figures 5 and 7 will clearly disclose that it would not be possible to merely revolve the folded table about pivot 30, and to overcome this difficulty we have provided the construction shown in greater detail in Figure 6. This consists of an elongated central hole or slot 34 in member 30 and we have further provided a plurality of U-shaped openings 36. These have been shown in Figure 6 as a straight, or horizontal line. If it is desired to incline the table then the positions of openings 36 must be changed accordingly. Secured within member 28 are two pins which extend outwardly from member 28 on each side. Pin 38 is positioned to engage slot 34 and pin 40 is so positioned that when pin 38 is at one end of the slot, as indicated in Figure 6, pin 40 will clear the quadrant member of pivot 30, but when pin 40 is aligned with one of the openings 36 and pin 38 is moved to the extreme opposite end of slot 34, a locking engagement is provided, as is illustrated in Figures 5 and 7.

Now, there are certain occasions when it may not be possible to use our pivot assembly 30 and 28. Under these conditions we believe it will be apparent that slides might be provided for the table, as indicated in Figures 3 and 4. This arrangement, which consists of the two slide members 44 and 46, enables the operator to pull out the table, then unfold the same and use. The table is held in position by overhanging lip members on guides 44 and 46, as illustrated in the sectional view of Figure 3 at 48. As before, however, if it is desired to use our table on the steering wheel, it is only necessary to entirely withdraw the table unfolded and hook it on the steering wheel, after the manner disclosed in Figure 2. With the form shown in Figure 8 this same action is accomplished by withdrawing the table so that tongue 25 will no longer engage guideway 24.

The foregoing description and the accompanying drawings are believed to clearly disclose a preferred embodiment of our invention but it will be understood that this disclosure is merely illustrative and that such changes in the invention may be made as are fairly within the scope and spirit of the following claims.

What we claim is:

1. An automobile table consisting of a table portion; a guide way fixedly secured to the table portion; a support member, having a standard adapted to engage the guide way and a T shaped support bar adapted to support the table; a supporting arm secured to the support member; a pivot member adapted to engage the supporting arm; and a bracket disposed to pivotably support the pivot member and provide an anchorage for the table.

2. An automobile table consisting of a fixed table portion; a second table member hingedly secured to the fixed portion; a guide way fixedly secured to the fixed portion; a support member, having a standard adapted to engage the guide way and a T shaped support bar adapted to support the table; a supporting arm secured to the support member; a pivot member adapted to engage the supporting arm; and a bracket disposed to pivotably support the pivot member and provide an anchorage for the table.

3. An automobile table consisting of a fixed table portion; a second table member hingedly secured to the fixed portion; a guide way fixedly secured to the fixed portion; a support member, having a standard adapted to engage the guide way and a T shaped support bar adapted to support the table; a supporting arm secured to the support member having a pivot pin disposed at its outer-end and a supporting pin adjacent thereto; a pivot member having a slot engaging the pivot pin and a plurality of U shaped openings adapted to engage the supporting pin; and a bracket disposed to pivotably support the pivot member and provide an anchorage for the table.

4. An automobile table consisting of a fixed table portion; a second table member hingedly secured to the fixed portion; a guide way fixedly secured to the fixed portion; a support member, having a standard adapted to engage the guide way and a T shaped support bar adapted to support the table; a supporting arm secured to the support member having a pivot pin disposed at its outer-end and a supporting pin adjacent thereto; a pivot member having a slot engaging the pivot pin and a plurality of U shaped openings adapted to engage the supporting pin; and a bracket disposed to pivotably support the pivot member and provide an anchorage for the table.

5. An automobile table consisting of a fixed table portion; a second table member hingedly secured to the fixed portion; a guide way fixedly secured to the fixed portion; a support member, having a standard adapted to engage the guide way and a T shaped support bar adapted to support the table; a supporting arm secured to the support member having a pivot pin disposed at its outer-end and a supporting pin adjacent thereto; a pivot member having a slot engaging the pivot pin and a plurality of U shaped openings adapted to engage the supporting pin; and a bracket disposed to pivotably support the pivot member and provide an anchorage for the table.

6. An automobile table consisting of a fixed table portion; a second table member hingedly secured to the fixed portion; a guide way fixedly secured to the fixed portion; a support member, having a standard adapted to engage the guide way and a T shaped support bar adapted to support the table; a support arm secured to the support member having a pivot pin disposed at its outer-end and a supporting pin adjacent thereto; a pivot member having a slot engaging the pivot and a plurality of U shaped openings adapted to engage the supporting pin; and a bracket disposed to pivotably support the pivot member and provide an anchorage for the table.

In witness whereof, we hereunto subscribe our names this 6th day of July, A. D. 1931.

FRED BAYMAN.
RICHARD C. BRENNESHOLTZ.